April 13, 1943.　　J. ZALKIND　　2,316,209
SUMMARY FORM MEANS
Filed Feb. 9, 1939　　2 Sheets-Sheet 1
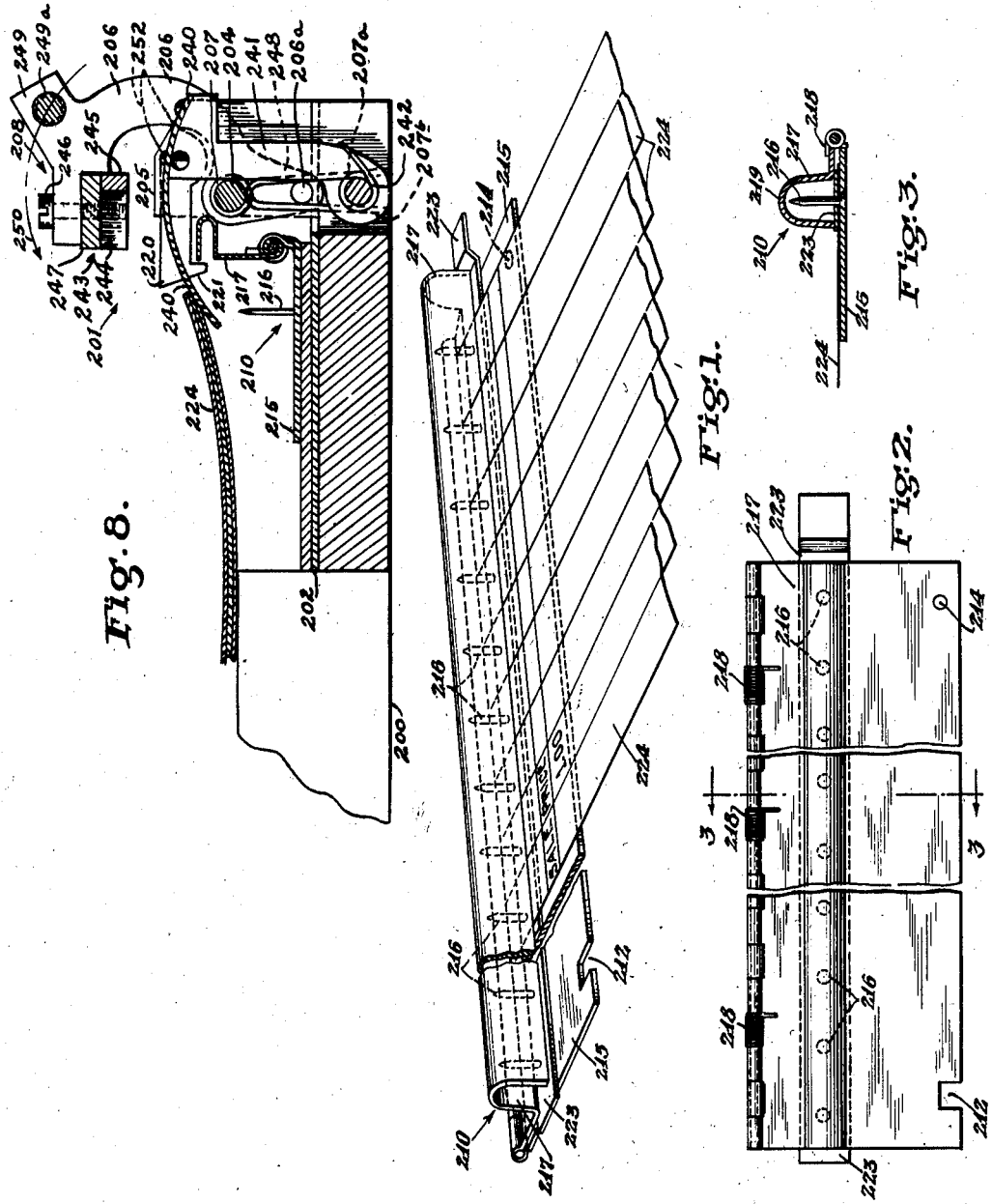
INVENTOR.
Joseph Zalkind
BY Ostrolenk & Greene
ATTORNEYS

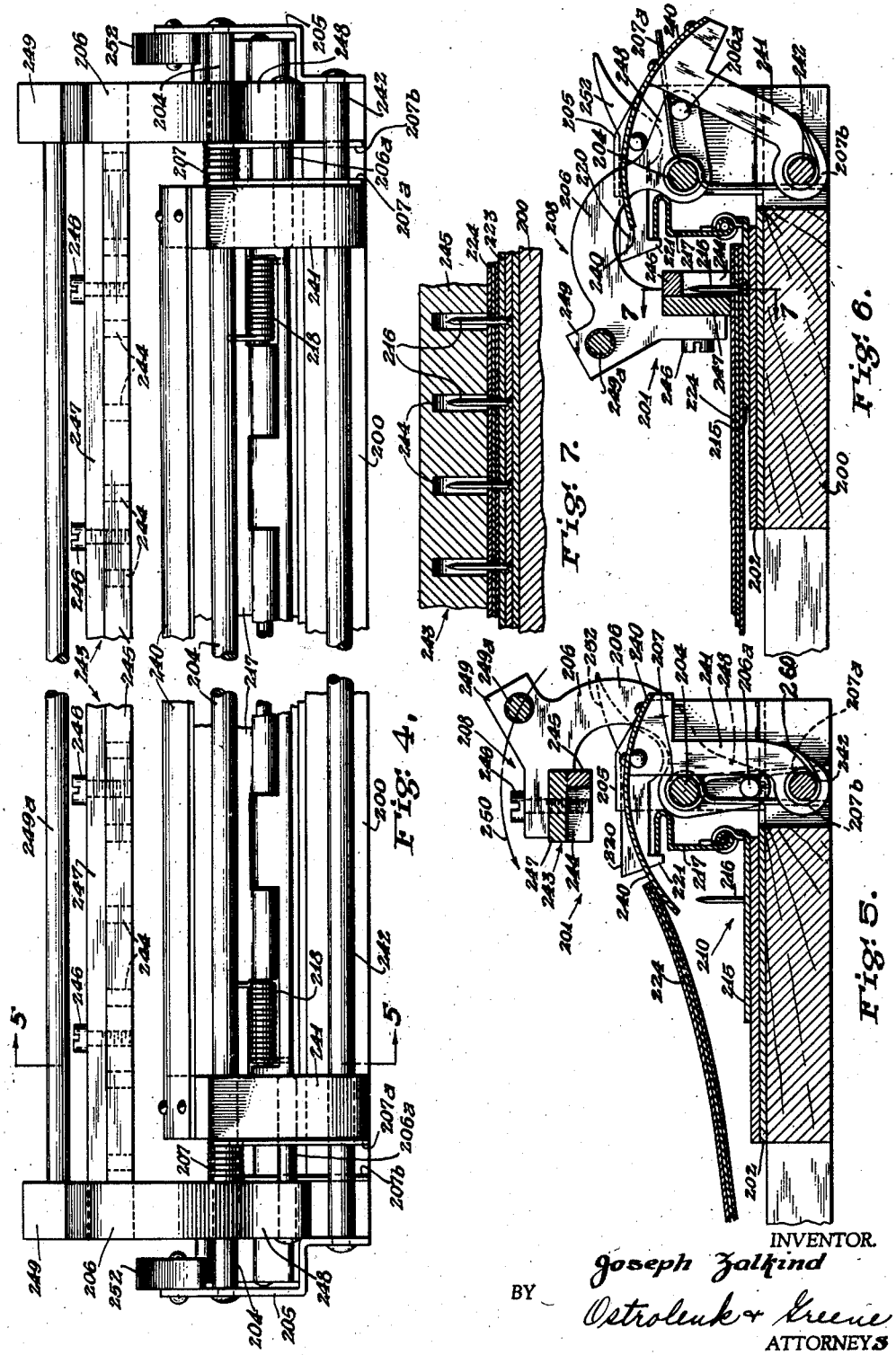

Patented Apr. 13, 1943

2,316,209

UNITED STATES PATENT OFFICE 2,316,209

SUMMARY FORM MEANS

Joseph Zalkind, New York, N. Y.

Application February 9, 1939, Serial No. 255,413

3 Claims. (Cl. 129—4)

This invention relates to a device to facilitate the summary and computation of data contained in a series of similar slips, sheets, records or forms, the items on each of such slips being the same, said series of slips or sheets varying from each other in the amounts or figures placed next to similar items. Throughout the description herein, sales slips will be referred to by way of illustration only; it will be readily understood that a means which will facilitate the computation, distribution or other accounting and tabulating processes which relate to sales slips, may also be utilized advantageously with reference to other types of sheets or forms and other problems of computation of various kinds.

In one general type of sales slip, a series of items or articles are arranged vertically upon such slip in columnar form. In an adjoining column, a space is provided wherein the quantity, if any, of each item sold may be placed, and, in another column, spaces are provided for the entry of the value of the item sold; each slip usually being used for a single sales transaction only, although such sales transaction may relate to several different items of merchandise. It may be desired, when the sales slips for various salesmen and customers are collected, to tabulate the total value of any particular item sold and recorded upon such sales slips, or the total quantities of such items; or, as is usually the case, it is necessary, as to each item, to tabulate and record both the total value and amount of such items sold over a specific period or set forth in a particular series of sales slips. Such computation will be facilitated if the sales slips may be so arranged relative to each other as to permit a quick reading of the amount on each of such slips relating to a single item, thus obviating the handling of each slip during the computation.

An object of this invention therefore, is to provide a means for arranging and holding a series of slips or sheets in substantially parallel overlapping relationship in such a manner that items on each of such slips relating to the same subject matter will lie in a common line or row and thus facilitate the reading of such matter for the purpose of computation, analysis, comparison or statistical study.

Heretofore, this object has been accomplished by various means: In the method most commonly in use at present, the slips or sheets are perforated in a predetermined manner along a specific edge, the perforations being required to be spaced in exact dimensional relationship to each other, to the edge of the sheet and to the printed matter thereon. The perforations on such sheets are then utilized to engage them upon pegs or supports for the purpose of arranging them for study and computation. Difficulty is often encountered in obtaining exact registration of the printed matter on such sheet in relation to the edge of the sheet, and further difficulty is encountered in causing the perforations to register in exact relationship to the printed matter. Owing to the fact that the perforations predetermine the exact line along which the sheet is subsequently held for tabulating purposes, a very slight inaccuracy in register of the printed matter or of the line of perforations will throw the matter to be computed out of alignment and prevent the creation of parallel rows of figures which are required for simple tabulation. Such slight inaccuracies in register often are unavoidable and always result in a mass of sheets which are useless from the point of view of rapid tabulation since individual handling of each sheet is then required. In addition, the perforating or punching of all sheets to be used in such a method is an expensive process and results also in added printing costs. The more expensive "Flat Bed" printing must be used since rotary printing does not give the exact register required when the sheets are pre-perforated.

Further objects of this invention, therefore, are to provide a means which will facilitate the summary and tabulation of record sheets wherein such sheets may be engaged and positively held in desired parallel relationship and alignment for the purpose of tabulation, wherein printed matter on each sheet may, if desired, be aligned with printed matter on other sheets irrespective of the inaccuracy of register of such printed matter upon its sheet, and wherein this may be done without prior perforation or other treatment of the sheet.

Additional objects of this invention are to provide a means which will not merely frictionally grip the record sheet but which will positively hold it against undesired removal, to provide a means which will permit the alignment and positive holding of each such sheet individually the moment it is placed upon the summary means, such positive hold not being relinquished when other sheets are aligned upon such means; to provide a simplified means wherein the sheets, after tabulation, may be reversed for tabulation of material on the opposite side thereof; to provide a simplified means, inexpensively constructed, wherein the arrangement of the sheets upon the summary means need not interfere with or interrupt the tabulation operation, thus increasing the efficiency of the computing operator; to provide a simple guide means to facilitate the reading of the rows of figures and items; to so construct the guide means as to facilitate the arrangement of the sheets; and to provide complete protection for the user or operator of the summary means.

Other objects and uses of this invention will, in part be apparent and, in part, pointed out in the following description and drawings in which:

Figure 1 is a view in perspective of the removal member 210 of Figure 5.

Figure 2 is a top view of a portion of the member of Figure 1.

Figure 3 is a cross sectional view taken on the line 3—3 of Figure 2 looking in the direction of the arrow.

Figure 4 is a top plan view of a preferred form of the operating mechanism forming my summary board.

Figure 5 is a cross sectional view taken on the line 5—5 of Figure 4.

Figure 6 corresponds to Figure 5 showing the perforator in a depressed position.

Figure 7 is a cross sectional view taken on the line 7—7 of Figure 6 looking in the direction of the arrows.

Figure 8 is a view corresponding to that of Figure 5 showing the impaling and perforating apparatus depressed beneath the plane of the board.

A preferred form of my invention is illustrated in Figures 4-7, in which the summary board or backing support 200 has mounted thereon at the end thereof the perforating means 201. The perforating means 201 comprises a base plate 202 and a back plate 203. A rod 204 is supported in the bearings 205 which in turn are mounted on the base plate 202. The rod 204 carries rotatable members 206 rotatably mounted thereon. The rotation of the rotatable members about the rod 204 is limited by the springs 207, one end of each of which is captured within a rotatable member 206, the other end secured within the bearing 205. The springs 207 are so arranged that in the normal position the rotatable members 206 are in the position shown in Figure 5. The rotatable members 206 carry a perforator 208 having perforations 209 on the under-side thereof.

A removable member 210 (Figures 1, 2 and 3) is removably secured on the base plate 202 by means of a suitable hook, which registers with the corresponding notch 212 (Figure 1) and a suitable post of the base plate 202 which registers with the corresponding perforation 214 of the removable member 210 (Figure 1).

The removable member 210 comprises plate 215 (Figs. 1 to 3), which carries thereon a series of pins 216, the function of which has been previously described. Hingedly connected to the plate 215 of the removable member 210 is a cover 217 which is normally maintained in the closed position as shown in Figures 1 and 3 by the springs 218. The cover 217 has a recessed portion 219 adapted to fit over the pins 216 and thus to cover them. When the removable member 210 is mounted on the summary board as shown in Figs. 5 and 6 the cover member 217 may be raised, and then held in raised position by the hooks 220 (Figs. 5, 6 and 8), said hooks 220 being rotatably mounted on the rod 204 and having a latch portion 221 for engaging the edge of the cover 217.

Pressure upon the leg 252 of the hook 220 will raise the latch portion 221 and thus permit the cover member to close over the pins 216. The slat 223, having perforations thereon (particularly Figure 3) may be mounted over the pins 216 before any forms 224 are placed upon the pins and will assist in removing such forms.

The operation of my summary board will be obvious. The forms 224 may be placed upon the pins 216 and the perforating member 208 may be depressed, thus impaling the forms 224 upon the pins 216 as previously described. It is obvious that any convenient portion of the perforating member 208 may be pressed down by hand and the entire perforating member will thus descend to impale the forms. In order to limit the upward movement of the perforating bar 208 and to have the said perforating bar mounted above the pins only the necessary distance above them to permit quick and simple operation, a set screw or other stop means may be mounted upon the back plate 203 to press against one of the rotatable members 206 preferably the central one and thus provide an optionally variable limit for the upward movement of the perforating member 208.

It is obvious that the cover 217 of the removable member 210 provides a back stop which will assist in aligning the paper.

In order to further facilitate the operation of my invention the entire base plate 202 and the perforating mechanism 201 may be depressed below the surface of the summary board 200 as shown in Fig. 8 so that the points of the pins 216 will lie substantially in the plane of the upper surface of the summary board 200. In this manner instead of requiring that the forms be lifted up and pressed on the pins 216 the forms 224 may merely be slid back along the board 200 and over the nails 216 and then the perforator 208 depressed.

When the forms are properly arranged on the pins 216 the legs 252 of the hook 220 may be depressed thus releasing the cover 217 so that the springs 218 will force the cover down over the nails 216 producing the condition shown in Figure 1. The entire removable member 210 may then be removed from the summary board and carried with the forms arranged thereon to the computer or tabulator. Obviously the forms may be tabulated while they are on the original summary board but the removable member provides for removal of the arranged forms and obviates the necessity for unnecessary duplication of apparatus.

It will also be obvious that any danger of injury to the operator by reason of the pins is to a great extent obviated in that when the removable member or pin-carrying member 210 is in position on the summary board 200, access to the points of the pins 216 is made difficult by the fact that the perforated bar 208 is poised above the pins; while when the arranged forms are removed from the summary board the cover 217 (Figure 1) protects the user against any injury by the pins.

In all of the operations herein described, the one difficulty which must be at all times kept in mind is that of any possible danger to the operator by reason of the sharp points of the pins.

The preferred form and the one which seems to afford the most protection in use has been disclosed in Figures 4–7 inclusive. In this form, an additional covering member 240 is provided to insure that the points of the pins 216 will at all times be covered. Here again the summary board 200 has a perforating member 201 mounted thereon. The perforating member 201 has a base plate 202. A cover member 240 is pivotally mounted upon rotatable arms 241, 241. The rotatable arms 241 are rotatably mounted on the rod 242 and suitable means may be provided such as spring 260 to normally maintain the cover member in position as shown in Figure 5 where the forward edge of the cover member 240 covers the pins 216. A perforating member 208 is mounted pivotally on rotatable member 206 upon the bar 204 and springs 207 normally maintain such perforating member 208 in the position as shown in Figure 5 by means of legs 207a pressing against the studs 206a on the cams 248. The leg 207b presses against the fixed rod 242. A spring 260, one leg of which is secured by the shaft 242 and the other leg of which bears behind the supporting member 241 for the cover 240 normally biases the cover member toward covering position.

In this type of form I provide however a bar 243 at the forward end of the perforating member 208, said bar having a series of perforations 244 (Figures 6, 7) therein which register with the pins 216 when said bar is depressed to the position shown in Figure 6. The perforating bar 243 may take many forms. In the preferred form, I provide a bar 245 having a series of slots cut therein which form three sides of the perforations 244 and then I attach by any suitable means such as the screw 246 a cover bar 247 to said first bar 245 thus producing the perforating bar 243 and the perforations 244.

In this form the rotatable members 206 continue beyond the rod 204 upon which they are mounted and form the cam 248 (Figures 5 and 6). The operation of this form of the invention will now be clear. The forms 224 are placed (Figure 5) with their ends resting upon the lip of the cover member 240. The operator then grasps the end or handle 249 or bar 249a of the perforating member 208 and pushes the perforating member 208 forward and down in the direction indicated by the arrow 250 to the position shown in Figure 6. The performance of this operation causes the cam 248 to rotate backwardly in the opposite direction and to press studs 206a against the rotatable members 241 thus pushing such members back and thereby pushing back the cover member 240 in the opposite direction to the position shown in Figure 6. The pins 216 are thus uncovered in time to receive the papers 224, and the perforations 244 which impale the papers on the pins.

It will thus be seen that the pins 216 at all times remain covered thus protecting the operators and that the only way to remove the cover 240 from its position above the pins is to depress the perforating member 208 so that the perforations 244 register with the pins 216 in which case the pins again are kept covered. While I have here shown a use of the cover member wherein the papers are laid on the lip of the cover, such papers may in the first instance be inserted in the gap between the cover members and the pins. When the forms are completely tabulated, the hook 220 may be released so that the latch portions 221 thereof no longer engage the cover 217 thus permitting the cover to drop and permit the removal of the arranged and tabulated forms.

In this final improved form also the perforating and impaling apparatus may (as shown in Figure 8) without any change in the construction or formation thereof be depressed below the plane of the summary board so that the points of the pins 216 and the forward lip of the cover member 240 lie substantially in the plane thereof for purposes herein described.

Also, any of the removal slats or members herein described may be mounted on the tabulation board as heretofore described in reversed position to make the backs of the arranged forms available for tabulation.

In the foregoing description and in the following claims, I have been well aware of Patent No. 1,817,640 issued to N. E. Newman et al. on August 4, 1931; Reissue Patent No. 19,994 issued to F. A. Niemann et al. on June 2, 1936; Patent No. 1,884,814 issued to F. A. Niemann et al., on October 25, 1932; Patent No. 2,033,147, issued to F. A. Niemann et al., on March 10, 1936; Reissue Patent No. 19,743, issued to N. E. Newman, et al., October 29, 1935,—all of which require prior perforation in a predetermined manner of the sheets or records to be tabulated.

I am also aware of the following patents each of which also require prior predetermined perforation of the sheets or records: Patent No. 2,006,795 to G. H. Dawson, July 2, 1935; Patent No. 2,036,684 to G. H. Dawson, April 7, 1936; Patent No. 2,000,558 to G. H. Dawson, May 7, 1936; Patent No. 2,077,677 to G. H. Dawson, April 20, 1937; Patent No. 1,958,743 to R. L. Connor, May 15, 1934; and Patent No. 1,988,368 to Ainsworth, January 15, 1935.

I am also aware of Patent No. 1,844,744 to W. O. Critchfield, Feb. 9, 1932, which does not permit individual alignment and positive holding of each sheet before the next one is placed on the aligning device, but requires that all the sheets be arranged and held manually or otherwise in a manner not set forth, before the holding device can be closed. There is no means for preventing accidental movement of the sheets relative to each other until they are all aligned and the device closed.

I am also aware of Patent No. 2,061,878 to Niemann, Nov. 24, 1936, which requires springclips which exert primarily a frictional rather than a positive hold. Some of the spring clips holding a sheet must be raised to permit the placement and aligning of the adjoining sheet; or the sheets must be held at one corner only until the superposed and adjacent sheets are laid down, thus making alignment more difficult. Further, the spring clips must be laterally adjustable for different sizes of sheets—all of which difficulties are not present in my invention.

Having described my invention, I claim:

1. A record sheet holder comprising a backing support adapted to receive a multiplicity of strips of paper having columns of numerical data; means carried by said backing support for positively engaging the ends of said strips to hold them in spaced stepped relation across said backing support with columns exposed, said means comprising a row of pins carried by said backing support; means for impaling each of said strips upon appropriate pins, each impaled strip remaining in predetermined position while subsequent strips are applied; said impaling means comprising a bar having perforations registering with said pins; said bar being mounted above the pins on members retaining it in raised position, said members being arranged to yield to manual pressure upon said bar, and a shield covering said pins when said bar is raised, said shield being arranged to receive the ends of said strips; said shield being arranged to expose said pins and leave said strip ends upon said pins when said bar is lowered for the perforations to impale said strips on said pins.

2. A record sheet holder comprising a backing support adapted to receive a multiplicity of strips of paper having columns of numerical data; means carried by said backing support for positively engaging the ends of said strips to hold them in spaced stepped relation across said backing support with columns exposed, said means comprising a row of pins carried by said backing support; means for impaling each of said strips upon appropriate pins, each impaled strip remaining in predetermined position while subsequent strips are applied; said impaling means comprising a bar having perforations registering with said pins; said bar being mounted above the pins on members retaining it in raised position, said members being arranged to yield to manual pressure upon said bar, and a shield covering said pins when said bar is raised, said shield being arranged to receive the ends of said strips; said shield being arranged to expose said pins and leave said strip ends upon said pins when said bar is lowered for the perforations to impale said strips on said pins, the mounting of said pins and shield being depressed below the face of said backing support; the points of said pins and the face of said shield being substantially even with the face of said backing support.

3. A record sheet holder comprising a backing support adapted to receive a multiplicity of strips of paper having columns of numerical data; means carried by said backing support for positively engaging the ends of said strips to hold them in spaced stepped relation across said backing support with columns exposed, said means comprising a row of pins carried by said backing support; means for impaling each of said strips upon appropriate pins, each impaled strip remaining in predetermined position while subsequent strips are applied; the mounting of said pins being depressed below the face of said backing support; the points of said pins being substantially even with the face of said backing support.

JOSEPH ZALKIND.